L US011043706B2

(12) United States Patent
Huff et al.

(10) Patent No.: US 11,043,706 B2
(45) Date of Patent: Jun. 22, 2021

(54) BATTERY MANAGEMENT SYSTEM (71) Applicant: Artisan Vehicle Systems Inc., Camarillo, CA (US)

(72) Inventors: Brian R. Huff, Newbury Park, CA (US); Kyle Hickey, Moorpark, CA (US); Michael E. Kasaba, Malibu, CA (US)

(73) Assignee: Artisan Vehicle Systems Inc., Camarillo, CA (US)

( * ) Notice: Subject to any disclaimer, the term of this patent is extended or adjusted under 35 U.S.C. 154(b) by 0 days.

(21) Appl. No.: 16/787,994

(22) Filed: Feb. 11, 2020

(65) Prior Publication Data
US 2020/0176830 A1 Jun. 4, 2020

Related U.S. Application Data (63) Continuation of application No. 15/712,110, filed on Sep. 21, 2017, now Pat. No. 10,615,465.
(Continued)

(51) Int. Cl.
*H01M 10/48* (2006.01)
*H01M 10/42* (2006.01)
(Continued)

(52) U.S. Cl.
CPC ....... *H01M 10/482* (2013.01); *H01M 10/425* (2013.01); *H01M 10/441* (2013.01);
(Continued)

(58) Field of Classification Search
CPC ............ H01M 10/482; H01M 10/425; H01M 2/1077; H01M 10/441; H01M 2010/4271;
(Continued)

(56) References Cited

U.S. PATENT DOCUMENTS 7,854,282 B2 * 12/2010 Lee ........................ B60W 20/00
180/65.24
10,236,694 B2 * 3/2019 Greening .............. H02J 7/0022
(Continued)

FOREIGN PATENT DOCUMENTS

EP         3516729 A1    7/2019
WO      2018/057860     3/2018

OTHER PUBLICATIONS

International Search Report and Written Opinion dated Jan. 9, 2018 for PCT Application No. PCT/US2017/052913.
(Continued)

*Primary Examiner* — M Baye Diao
(74) *Attorney, Agent, or Firm* — Plumsea Law Group, LLC (57) ABSTRACT The disclosed battery management system generally includes at least one bi-directional balancing circuit and a power supply including a first battery module and a second battery module, each having at least one battery cell. The balancing circuit may be configured to transfer excess charge from one or more battery cells of the first battery module to one or more battery cells of the second battery module. By redistributing the level of charge within one or more battery cells, the balancing circuit can cause the overall charge of a power supply to last longer by taking advantage of excess charge found within one or more battery cells. Additionally, the balancing circuit may be connected to a bus bar that may be utilized to power additional accessories within a vehicle.

19 Claims, 7 Drawing Sheets

Related U.S. Application Data (60) Provisional application No. 62/512,553, filed on May 30, 2017, provisional application No. 62/398,857, filed on Sep. 23, 2016.

(51) Int. Cl.
| | |
|---|---|
| *H01M 50/20* | (2021.01) |
| *H01M 10/44* | (2006.01) |
| *H02J 7/00* | (2006.01) |
| *H01M 10/0525* | (2010.01) |

(52) U.S. Cl.
CPC .......... *H01M 50/20* (2021.01); *H02J 7/0016* (2013.01); *H01M 10/0525* (2013.01); *H01M 10/486* (2013.01); *H01M 2010/4271* (2013.01); *H01M 2220/20* (2013.01); *Y02E 60/10* (2013.01); *Y02T 10/70* (2013.01)

(58) Field of Classification Search
CPC .......... H01M 2220/20; H01M 10/486; H01M 10/0525; H02J 7/0016; Y02E 60/10; Y02T 10/70
USPC ........................................ 320/118
See application file for complete search history.

(56) References Cited

U.S. PATENT DOCUMENTS

| | | | | |
|---|---|---|---|---|
| 10,442,299 | B2* | 10/2019 | Enthaler | B60L 58/20 |
| 10,442,309 | B2* | 10/2019 | Goetz | B60L 50/66 |
| 2008/0191663 | A1* | 8/2008 | Fowler | H02J 7/0019 |
| | | | | 320/118 |
| 2012/0206095 | A1 | 8/2012 | Marten | |
| 2012/0274283 | A1 | 11/2012 | Van Lammeren | |
| 2013/0099746 | A1* | 4/2013 | Nork | B60L 11/1866 |
| | | | | 320/118 |
| 2013/0193925 | A1 | 8/2013 | Abe et al. | |
| 2014/0042980 | A1 | 2/2014 | Floros | |
| 2014/0183939 | A1* | 7/2014 | Jiang | B60L 7/10 |
| | | | | 307/9.1 |
| 2014/0290615 | A1* | 10/2014 | Bradfield | F02N 11/0851 |
| | | | | 123/179.25 |

OTHER PUBLICATIONS

International Preliminary Examination Report dated Apr. 4, 2020 for PCT Application No. PCT/US2017/052913.

EP Communication pursuant to Rules 161(2) and 162 EPC dated May 10, 2019 for European Patent Application No. 17853970.6.

\* cited by examiner

BATTERY MANAGEMENT SYSTEM

CROSS-REFERENCE TO RELATED APPLICATIONS

This application is a continuation of and claims benefit of priority to U.S. application Ser. No. 15/712,110, entitled "Battery Management System", filed on Sep. 21, 2017, which application claims the benefit under 35 U.S.C. 119(e) to: U.S. Provisional Application Ser. No. 62/398,857, entitled "Battery Management System", filed on Sep. 23, 2016, and U.S. Provisional Application Ser. No. 62/512,553, entitled "Battery Management System", filed on May 30, 2017, the entirety of all of which applications are incorporated herein by reference.

This application is related to co-pending U.S. patent application Ser. No. 15/712,114, filed on Sep. 21, 2017, which application published as U.S. Patent Application Publication Number 2018/0090725, and U.S. patent application Ser. No. 15/712,117, which application published as U.S. Patent Application Publication Number 2018/0090735, filed on Sep. 21, 2017, which applications are hereby incorporated by reference in their entirety.

BACKGROUND OF THE INVENTION

The present invention relates generally a battery management system. Specifically, the present disclosure relates to a battery management system used in heavy duty electric vehicles used in mining operations.

Large, high voltage batteries are used in heavy duty applications, such as in electric and hybrid vehicles used in underground mining. These batteries often include multiple battery modules each containing a set of individual battery cells.

Because of the inconsistent temperatures and rough conditions in which these batteries are used, these battery cells often begin to weaken at different rates. The weaker battery cells within a battery module tend to leak charge quicker than other batteries in the same battery module. This leaking causes the individual battery cells within a battery module to have varying charges. The type of batteries used in heavy duty applications are prone to inefficiency, overheating, and/or other issues when the individual battery cells within a battery module have different charges. Battery balancing systems are employed to help make batteries run more efficiently for a longer period of time.

There is a need in the art for a system and method that addresses the shortcomings of the prior art discussed above.

SUMMARY

The disclosed battery management system generally includes at least one bi-directional balancing circuit and a power supply including a first battery module and a second battery module, each having at least one battery cell. Because battery cells sometimes tend to lose charge at different rates, the battery cell(s) within the first battery module may have a different level of charge than the battery cell(s) within the second battery module. If the first and second battery modules were used without balancing the charges of the individual cells of each battery module, the amount of electrical energy provided by the power supply would be limited by the individual battery cell having the lowest charge. The balancing circuit can increase the amount of electrical charge provided by the power supply to be higher than the level of charge of the battery cell having the lowest charge. The balancing circuit may be configured to transfer excess charge from one or more battery cells of a first battery module to one or more battery cells of the second battery module. By redistributing the level of charge within one or more battery cells, the balancing circuit can cause the overall charge of a power supply to last longer by taking advantage of excess charge found within one or more battery cells.

In one aspect, the disclosure provides a battery management system, comprising a first battery module, a second battery module, and a bi-directional balancing circuit. The first battery module has a first plurality of battery cells, including a first battery cell and a second battery cell. The second battery module has a second plurality of battery cells, including a third battery cell and a fourth battery cell. The bi-directional balancing circuit is electrically connected to both the first battery cell and the third battery cell. The bi-directional balancing circuit is an integrated circuit configured to transfer charge between at least the first battery cell and the third battery cell.

In another aspect, the disclosure provides a battery management system, comprising a first battery module, a second battery module, and a bi-directional balancing circuit. The bi-directional balancing circuit is electrically connected to at least one battery cell of the first plurality of battery cells and at least one battery cell of the second plurality of battery cells. The bi-directional balancing circuit is an integrated circuit configured to transfer charge between the at least one battery cell of the first plurality of battery cells and the at least one battery cell of the second plurality of battery cells.

In another aspect, the disclosure provides a battery management system, comprising a first battery module, a second battery module, and a bi-directional balancing circuit. The bi-directional balancing circuit is electrically connected to at least one battery cell of the first plurality of battery cells and at least one battery cell of the second plurality of battery cells. The bi-directional balancing circuit is an integrated circuit configured to balance the level of charge amongst both the first plurality of battery cells and the second plurality of battery cells.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
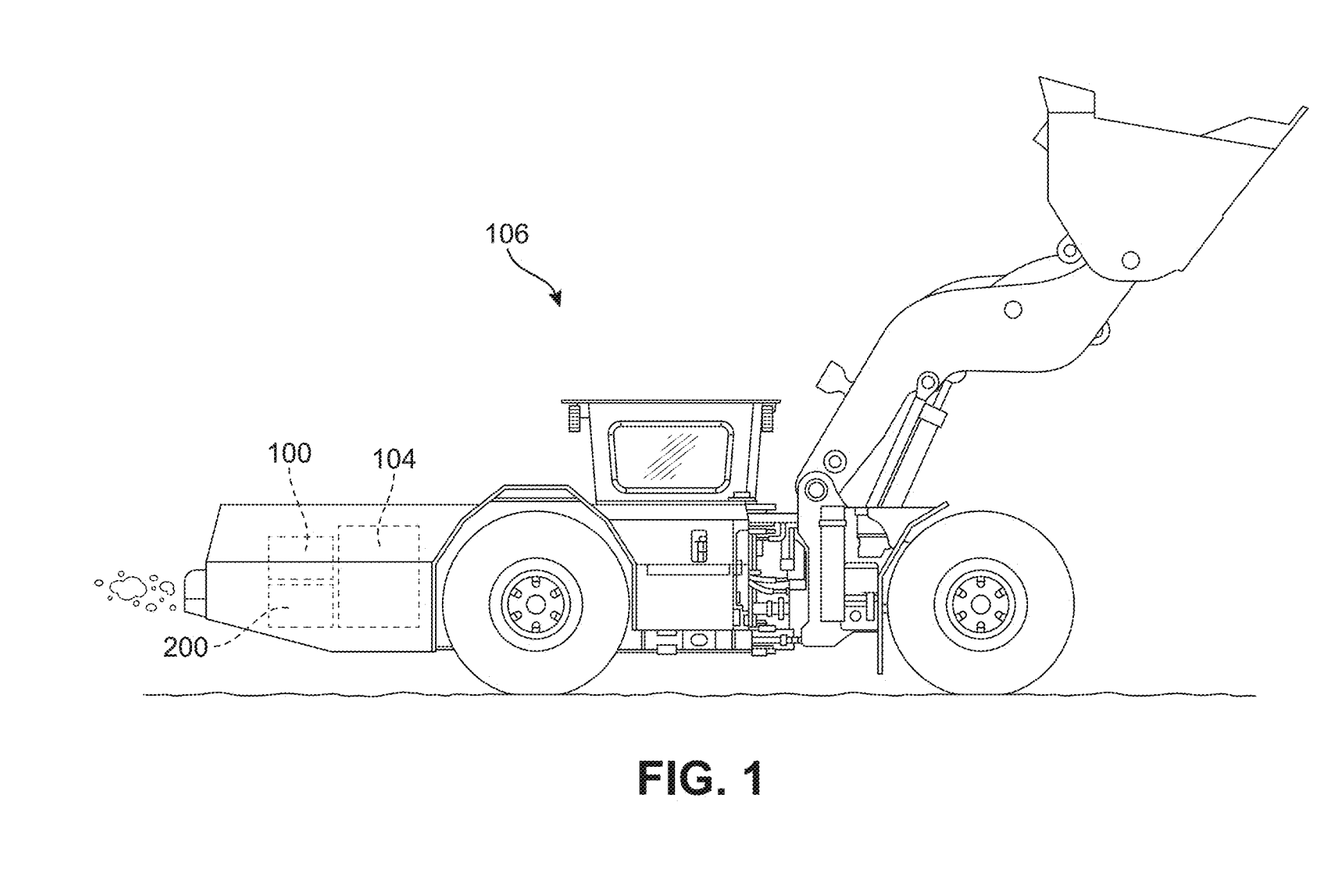
FIG. 1 shows a mining vehicle employing a battery management system, including a first battery module and a second battery module.
Figure 2:
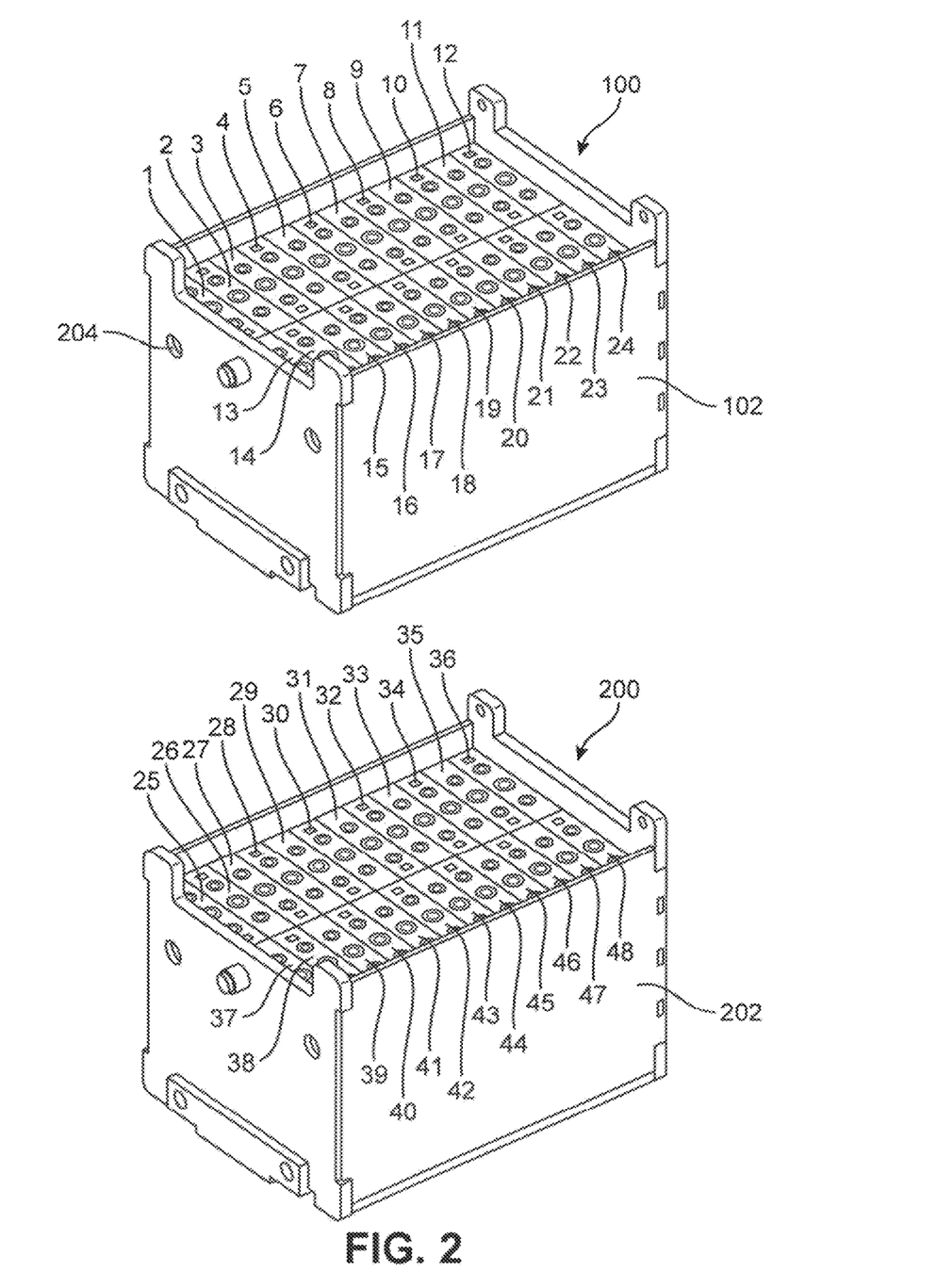
FIG. 2 shows an isometric view of the first battery module and the second battery module separate from the vehicle.
Figure 3:
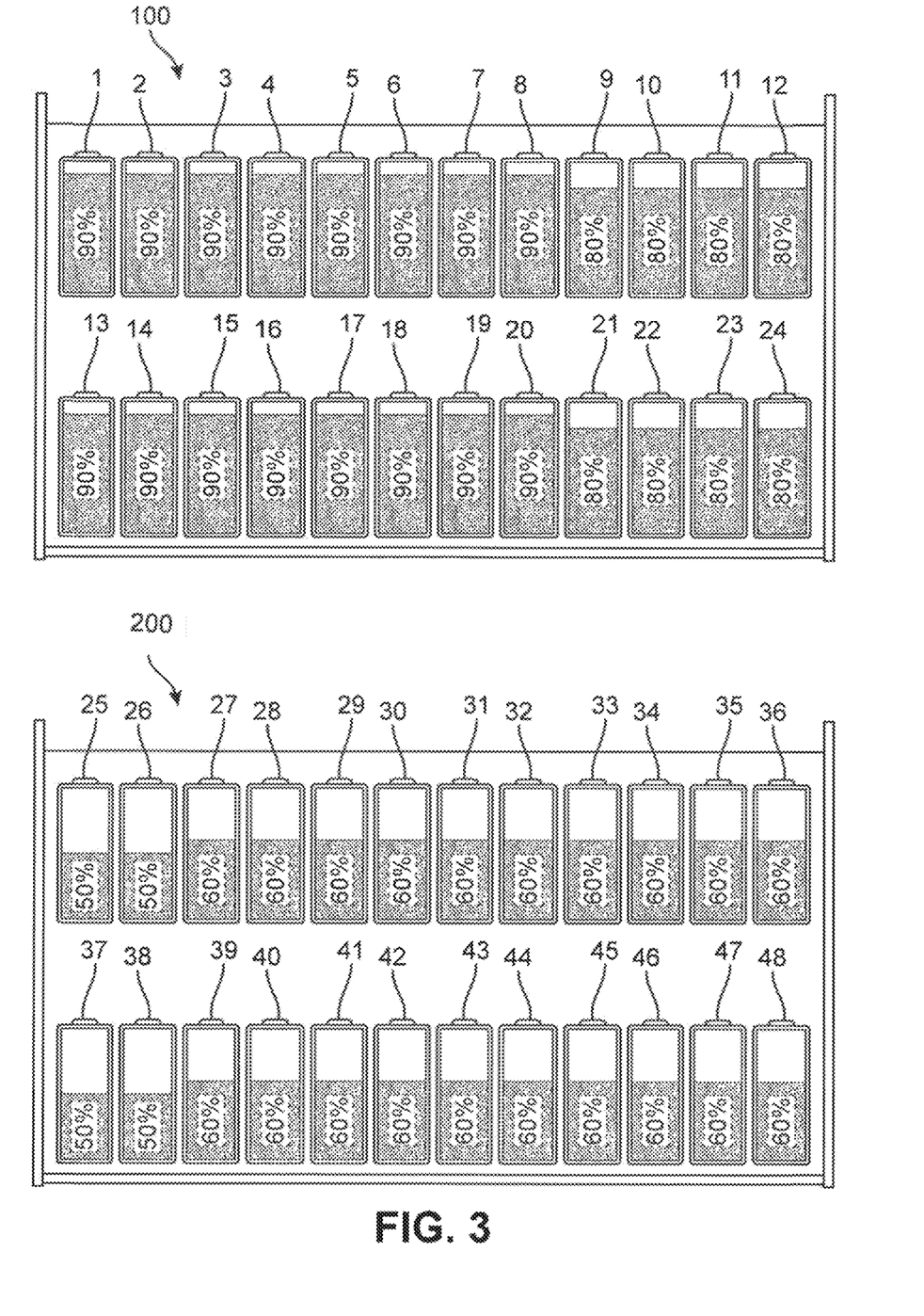
FIG. 3 shows a representation of the charge carried by the individual battery cells within the first battery module and the second battery module before the individual battery cells of both modules are balanced.
Figure 4:
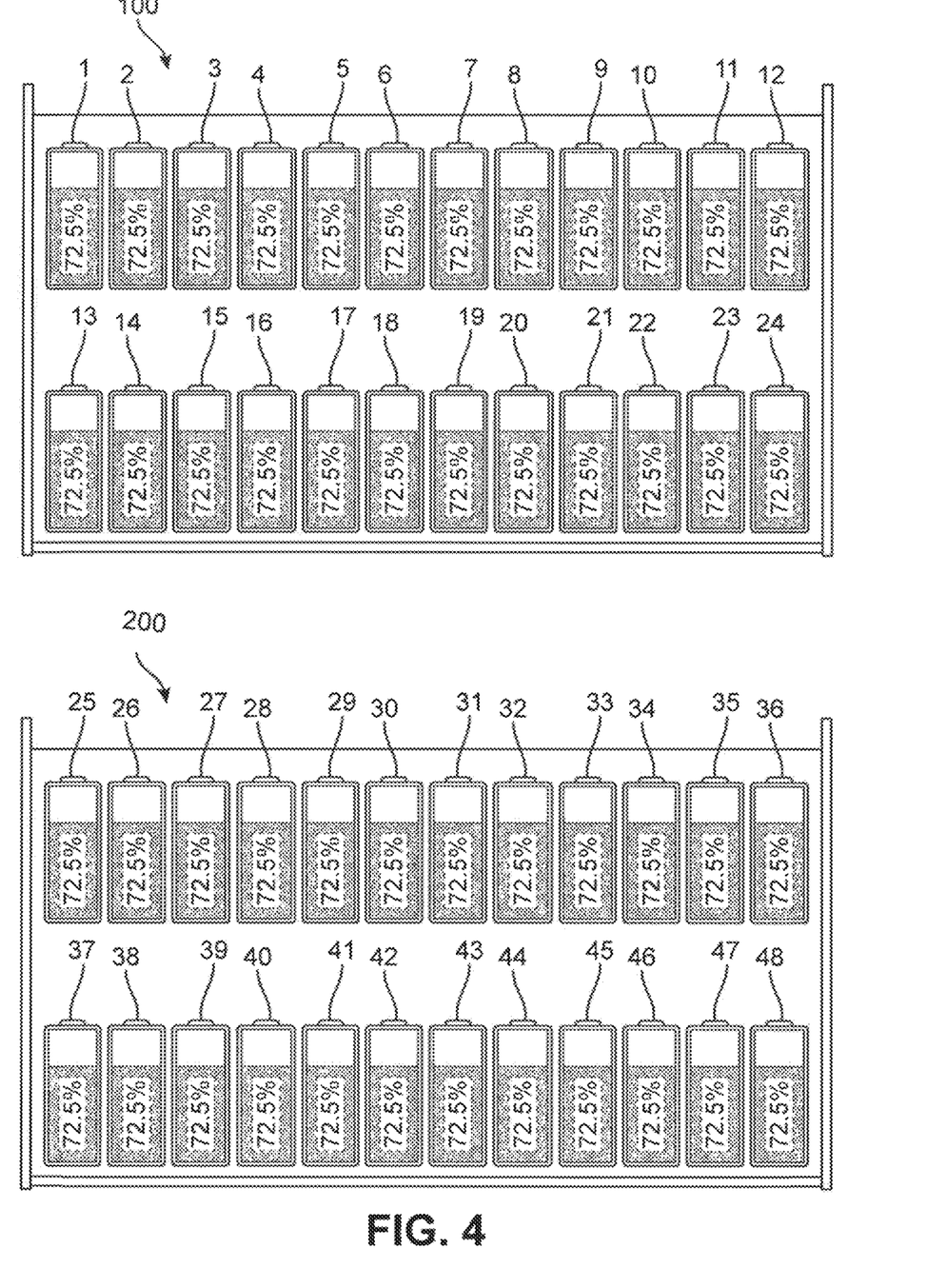
FIG. 4 shows a representation of the charge carried by the individual battery cells within the first battery module and the second battery module after the individual battery cells of both modules are balanced.
Figure 5:
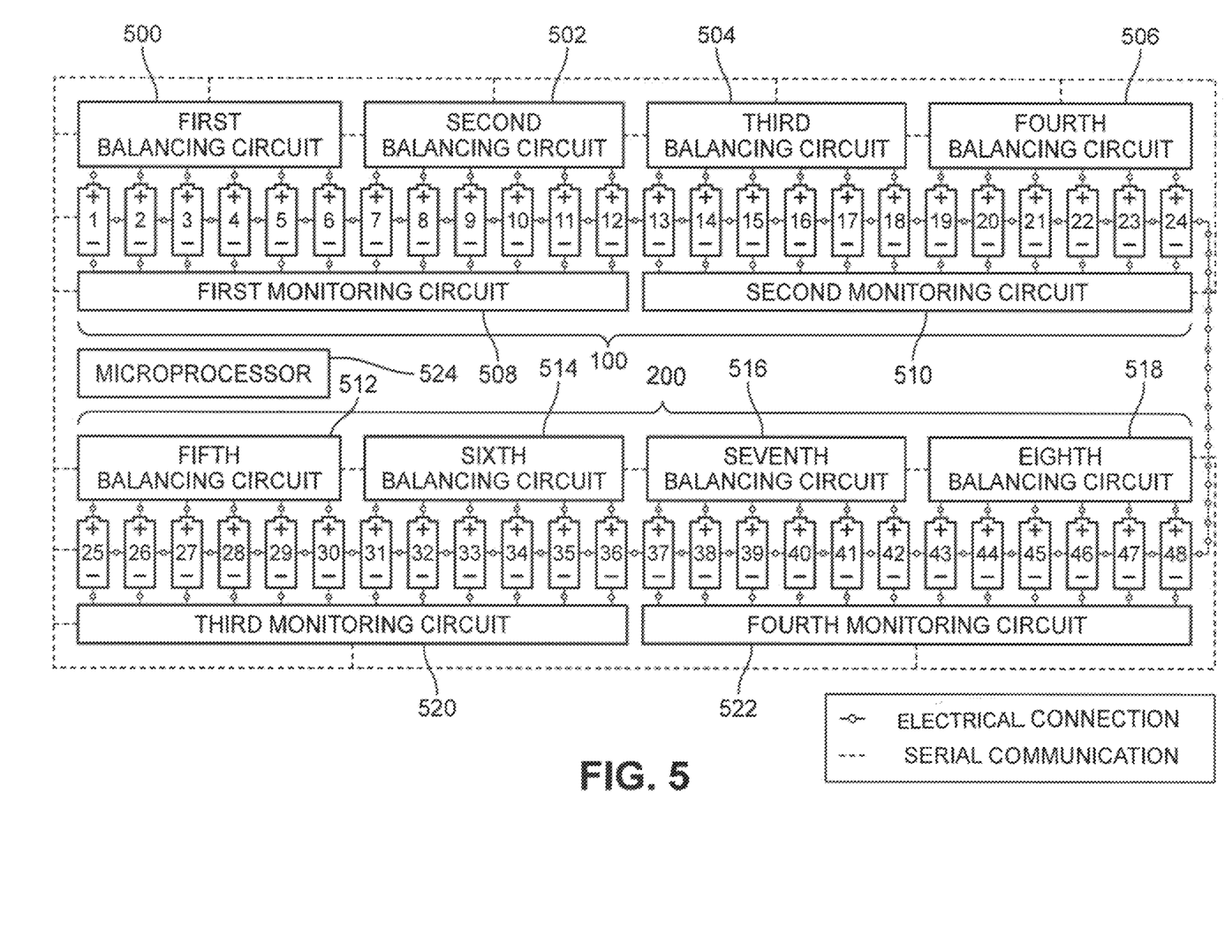
FIG. 5 shows a block diagram of an embodiment of the battery management system.

FIG. 1 shows a mining vehicle 106 employing a battery management system. The battery management system includes a bi-directional balancing circuit and a power supply including a plurality of battery modules, or battery stacks. FIG. 5, which is discussed in more detail below, shows a block diagram of an embodiment of the battery management system. The plurality of battery modules shown in FIGS. 1-5 are a first battery module 100 and a second battery module 200. FIG. 1 shows first battery module 100 and a second battery module 200 disposed within mining vehicle 106. As shown in FIG. 2, first battery module 100 and second battery module 200 each have at least one battery cell, and are electrically connected to an engine 104 of vehicle 106. First battery module 100 and second battery module 200 supply electrical power to engine 104. The battery management system balances the battery cells within first battery module 100 and second battery module 200 when the battery cells have differing levels of charge. For example, the battery management system balances the battery cells when a damaged battery module in a vehicle, such as mining vehicle 106, is replaced with another battery module, such as first battery module 100. FIGS. 3 and 4, also discussed below, demonstrate how the battery management system balances the battery cells.

FIG. 2 shows an isometric view of first battery module 100 and second battery module 200 separate from vehicle 106. As shown in FIG. 2, first battery module 100 includes a first plurality of battery cells. The first plurality of battery cells in this example includes 24 battery cells, which include the following: cell 1, cell 2, cell 3, cell 4, cell 5, cell 6, cell 7, cell 8, cell 9, cell 10, cell 11, cell 12, cell 13, cell 14, cell 15, cell 16, cell 17, cell 18, cell 19, cell 20, cell 21, cell 22, cell 23, and cell 24.

Second battery module 200 includes a second plurality of battery cells. The second plurality of battery cells in this example includes 24 battery cells, which include the following: cell 25, cell 26, cell 27, cell 28, cell 29, cell 30, cell 31, cell 32, cell 33, cell 34, cell 35, cell 36, cell 37, cell 38, cell 39, cell 40, cell 41, cell 42, cell 43, cell 44, cell 45, cell 46, cell 47, and cell 48. The second plurality of battery cells are shown as being disposed within a container 202. As shown in FIG. 5, the battery cells of the first plurality of battery cells are connected to one another in series. First battery module 100 and second battery module 200 are electrically connected together in series, as shown in FIG. 5 and described in more detail below.

The first plurality of battery cells are shown as being disposed within a container 102 of first battery module 100. The second plurality of battery cells are shown as being disposed within a container 202 of second battery module 200. The containers of the battery modules may include openings for wires to extend through and reach other components, such as a balancing circuit of another battery module. FIG. 2 shows an opening 204.

FIGS. 3 and 4 show an example of how the individual battery cells of two or more battery modules are actively balanced. In this example, first battery module 100 and second battery module 200 are being used to power vehicle 106. To demonstrate how the charges of the individual battery cells are balanced, FIGS. 3 and 4 show a representation of the battery charges of the individual battery cells of first and second battery modules before and after balancing. It is understood that the battery cells shown in FIGS. 3 and 4 are the same battery cells shown in FIG. 2. The charge of the battery cells shown in FIGS. 3 and 4 are given in percentages. The percentage is based on the charging capacity of the batteries. Over time, the charging capacity of battery cells change. The percentage of the battery cells shown in the example of FIGS. 3 and 4 are based on the present charging capacity of the battery cells, rather than the percentage of the battery cells' original charging capacity.

FIG. 3 shows a representation of the charge carried by the individual battery cells within first battery module 100 and second battery module 200 before the battery cells are balanced. FIG. 4 shows a representation of the charge carried by the individual battery cells within first battery module 100 and second battery module 200 after the battery cells are balanced. In the example of FIGS. 3 and 4, first battery module 100 is replacing another battery module (not shown) that has been taken out of a vehicle. Such a replacement is often made due to the strenuous conditions of heavy duty applications, such as underground mining, wearing out batteries. In the example shown in FIGS. 3 and 4, first battery module 100 was charged more recently than second battery module 200, which was being used to power the vehicle before first battery module 100 was added to the bank of battery modules. As a result, second battery module 200 has less overall charge than first battery module 100.

The individual battery cells within first battery module 100 have different charges from one another. As explained before, subjecting the battery cells to high temperatures causes the battery cells to weaken. As a result, the weakened battery cells leak charge. In certain applications, individual battery cells are subject to varying temperatures. Accordingly, the battery cells of the battery module that are subject to high temperatures may weaken before other battery cells of the same battery module that are not subject to the same high temperatures. For example, in the embodiment of FIG. 3, first battery module 100 was charged to 90% before being installed in vehicle 106. However, due to the weakness of some of the battery cells in comparison to other battery cells, the individual battery cells of first battery module 100 have different levels of charge. In the example of FIG. 3, cell 9, cell 10, cell 11, cell 12, cell 21, cell 22, cell 23, and cell 24 are 80% charged. Cell 1, cell 2, cell 3, cell 4, cell 5, cell 6, cell 7, cell 8, cell 13, cell 14, cell 15, cell 16, cell 17, cell 18, cell 19, and cell 20 are each charged 90%. Before first battery module 100 and second battery module 200 are balanced, first battery module 100 has 16 battery cells with 90% charge and 8 battery cells with 80% charge. In this example, the 8 battery cells having 80% charge are the weakest batteries in first battery module 100.

Similar to first battery module 100, the individual battery cells within second battery module 200 have different charges from one another. Because second battery module 200 was being used to power vehicle 106 before first battery module 100 was added to the bank of battery modules, FIG.

3 shows the second plurality of battery cells as having less charge than the first plurality of battery cells. FIG. 3 shows cell 25, cell 26, cell 37, and cell 38 as each being 50% charged. FIG. 3 shows cell 27, cell 28, cell 29, cell 30, cell 31, cell 32, cell 33, cell 34, cell 35, cell 36, cell 39, cell 40, cell 41, cell 42, cell 43, cell 44, cell 45, cell 46, cell 47, and cell 48 as each being 60% charged. Before first battery module 100 and second battery module 200 are balanced, second battery module 200 has 20 battery cells with 60% charge and 4 battery cells with 50% charge. In this example, the 4 battery cells having 50% charge are the weakest battery cells in second battery module 200 and are the weakest battery cells amongst the first plurality of battery cells and the second plurality of battery cells.

If the first and second battery modules were used without balancing the charges of the individual cells of each battery module, the battery power supplied to the vehicle would be limited by the individual battery cell having the lowest charge. In this example, cell 25, cell 26, cell 37, and cell 38 have the lowest charge (50%) of all of the individual battery cells of both first battery module 100 and second battery module 200. Accordingly, some of the charge in battery cells having higher charges than cell 25, cell 26, cell 37, and cell 38 goes unused. For example, cell 1 starts out 90% charged and ends with 40% charge. This 40% of charge capacity goes unused. In other words, cell 1 is left with an excess charge of 40%. With the disclosed battery management system, rather than letting excess energy go unused, this excess charge of 40% is utilized by distributing this excess charge amongst battery cells having less charge than cell 1. In the same manner, the disclosed battery management system distributes the excess charge of all individual batteries between first battery module 100 and second battery module 200. This means that excess charge from a battery cell in first battery module 100 can be distributed to a battery cell in second battery module 200. Conversely, the excess charge from a battery cell in second battery module 200 can be distributed to a battery cell in first battery module 100.

The excess charge for each battery cell within a bank of battery modules is the amount of charge above the charge of the battery cell having the lowest charge. In the example of FIGS. 3 and 4, the excess charge for each battery cell within first battery module 100 and second battery module 200 is the amount of charge that is above 50%. As stated before, the excess charge in cell 1 is 40%. Because cell 2, cell 3, cell 4, cell 5, cell 6, cell 7, cell 8, cell 13, cell 14, cell 15, cell 16, cell 17, cell 18, cell 19, and cell 20 are also 90% charged, these same cells also have an excess charge of 40%. Similarly, because cell 9, cell 10, cell 11, cell 12, cell 21, cell 22, cell 23, and cell 24 are 80% charged, these same cells have an excess charge of 30%. And because cell 27, cell 28, cell 29, cell 30, cell 31, cell 32, cell 33, cell 34, cell 35, cell 36, cell 39, cell 40, cell 41, cell 42, cell 43, cell 44, cell 45, cell 46, cell 47, and cell 48 are 60% charged, these same cells have an excess charge of 10%.

The disclosed battery management system distributes the excess charge from one or more individual battery cells to one or more battery cells having less charge. Taking energy from the battery cells having higher charges, and giving this energy to battery cells having lower charges brings the charge of all of the battery cells closer to being the same. In the example of FIGS. 3 and 4, the excess charge for individual battery cells within first battery module 100 and second battery module 200 is discharged from the batteries having excess charge and is distributed among the individual battery cells having lower charges. More particularly, the excess charge is distributed amongst the individual battery cells such that all of the individual battery cells of both first battery module 100 and second battery module 200 are equally charged. FIG. 4 shows the individual battery cells of first battery module 100 and second battery module 200 being 72.5% charged.

Balancing the charge within each battery module by balancing the cells, and within each pack of modules by balancing the state of charge of the modules, increases power efficiency in the equipment, and extends the life of each battery module. Being able to monitor the charge condition and balance the cells or modules also extends the operating cycle of the equipment to minimize downtime necessary to replace a battery module. Each battery module may be provided with an identifier, and a monitoring system may be employed to track the modules through their lifecycles by recording the states of charge, the rate of depletion, replacement cycles, etc. By tracking each battery module, it is possible to identify those modules which are losing charge more rapidly or less efficient to have those be serviced on a cell by cell basis or taken out of service.

The battery management system generally includes at least one bi-directional balancing circuit and a power supply including at least two battery modules each having at least one battery cell. As previously mentioned, FIG. 5 shows a block diagram of an embodiment of the battery management system. In this exemplary embodiment, at least two battery cells are electrically connected to one another in series within a single module. More specifically, FIG. 5 shows cell 1, cell 2, cell 3, cell 4, cell 5, cell 6, cell 7, cell 8, cell 9, cell 10, cell 11, cell 12, cell 13, cell 14, cell 15, cell 16, cell 17, cell 18, cell 19, cell 20, cell 21, cell 22, cell 23, and cell 24 all electrically connected to one another in series such that the individual battery cells can together supply electrical power to vehicle 106. The term "battery cell" is used herein to refer to a battery made of multiple cells. Thus, it is understood that each of battery cells within a module is made of multiple cells. In other words, a module is made up of multiple battery cells and each battery cell is made up of multiple individual cells. Referring to battery cells with the name "cell" is merely shortening the name and not changing the fact that each of the battery cells can include more than a single cell. The term "submodule" can also be substituted for "battery cell."

The battery management system shown in FIG. 5 includes a plurality of integrated balancing circuits, including first balancing circuit 500, second balancing circuit 502, third balancing circuit 504, fourth balancing circuit 506, fifth balancing circuit 512, sixth balancing circuit 514, seventh balancing circuit 516, and eighth balancing circuit 518. The plurality of bi-directional balancing circuits each comprise an integrated circuit configured to transfer charge between the at least one battery cell of the first plurality of battery cells and the at least one battery cell of the second plurality of battery cells. The exemplary balancing circuits are configured to implement a balancing algorithm to balance the charge amongst the individual battery cells of the first plurality of battery cells and the second plurality of battery cells.

In this exemplary embodiment, at least two battery cells of a single module are electrically connected to a bi-directional balancing circuit. More specifically, FIG. 5 shows cell 1, cell 2, cell 3, cell 4, cell 5, and cell 6 all electrically connected to a first balancing circuit 500. FIG. 5 shows cell 7, cell 8, cell 9, cell 10, cell 11, and cell 12 all electrically connected to a second balancing circuit 502. FIG. 5 shows cell 13, cell 14, cell 15, cell 16, cell 17, and cell 18 all electrically connected to a third balancing circuit 504. FIG. 5 shows cell 19, cell 20, cell 21, cell 22, cell 23, and cell 24 all electrically connected to a fourth balancing circuit 506.

In this exemplary embodiment, at least two battery cells of a single module are electrically connected to a monitoring circuit. More specifically, FIG. 5 shows cell 1, cell 2, cell 3, cell 4, cell 5, cell 6, cell 7, cell 8, cell 9, cell 10, cell 11, and cell 12 are all electrically connected to a first monitoring circuit 508. Cell 13, cell 14, cell 15, cell 16, cell 17, cell 18, cell 19, cell 20, cell 21, cell 22, cell 23, and cell 24 are all electrically connected to a second monitoring circuit 510.

Regarding the battery cells of second battery module 200, FIG. 5 shows cell 25, cell 26, cell 27, cell 28, cell 29, cell 30, cell 31, cell 32, cell 33, cell 34, cell 35, cell 36, cell 37, cell 38, cell 39, cell 40, cell 41, cell 42, cell 43, cell 44, cell 45, cell 46, cell 47, and cell 48 are all electrically connected to one another in series. FIG. 5 shows cell 25, cell 26, cell 27, cell 28, cell 29, and cell 30 all electrically connected to a fifth balancing circuit 512. FIG. 5 shows cell 31, cell 32, cell 33, cell 34, cell 35, and cell 36 all electrically connected to a sixth balancing circuit 514. FIG. 5 shows cell 37, cell 38, cell 39, cell 40, cell 41, and cell 42 all electrically connected to a seventh balancing circuit 516. FIG. 5 shows cell 43, cell 44, cell 45, cell 46, cell 47, and cell 48 all electrically connected to a eighth balancing circuit 518.

FIG. 5 shows cell 25, cell 26, cell 27, cell 28, cell 29, cell 30, cell 31, cell 32, cell 33, cell 34, cell 35, cell 36 are all electrically connected to a third monitoring circuit 520. Cell 37, cell 38, cell 39, cell 40, cell 41, cell 42, cell 43, cell 44, cell 45, cell 46, cell 47, and cell 48 are all electrically connected to a fourth monitoring circuit 522.

In the exemplary embodiment shown in FIG. 5, at least one battery cell of first battery module 100 is electrically connected to a battery cell of second battery module 200 in series. More specifically, cell 1 is electrically connected to cell 25 in series. As a result, the first plurality of battery cells are electrically connected to the second plurality of battery cells in series.

FIG. 5 shows the battery management system as including a microprocessor 524. Microprocessor 524 is in serial communication with all of the balancing circuits and monitoring circuits. Specifically, first balancing circuit 500, second balancing circuit 502, third balancing circuit 504, and fourth balancing circuit 506 are in serial communication with microprocessor 524. Fifth balancing circuit 512, sixth balancing circuit 514, seventh balancing circuit 516, and eighth balancing circuit 518 are in serial communication with microprocessor 524. First monitoring circuit 508 and second monitoring circuit 510 are in serial communication with microprocessor 524. Third monitoring circuit 520 and fourth monitoring circuit 522 are in serial communication with microprocessor 524.

FIG. 5 shows all of the monitoring circuits and balancing circuits as being in serial communication with one another. More specifically, first monitoring circuit 508 and second monitoring circuit 510 are in serial communication with one another. Third monitoring circuit 520 and fourth monitoring circuit 522 are in serial communication with one another. First balancing circuit 500, second balancing circuit 502, third balancing circuit 504, and fourth balancing circuit 506 are all in serial communication with one another. Fifth balancing circuit 512, sixth balancing circuit 514, seventh balancing circuit 516, and eighth balancing circuit 518 are all in serial communication with one another.

First monitoring circuit 508 and second monitoring circuit 510 are in serial communication with third monitoring circuit 520 and fourth monitoring circuit 522 via microprocessor 524. First balancing circuit 500, second balancing circuit 502, third balancing circuit 504, and fourth balancing circuit 506 are in serial communication with fifth balancing circuit 512, sixth balancing circuit 514, seventh balancing circuit 516, and eighth balancing circuit 518 via microprocessor 524. First monitoring circuit 508, second monitoring circuit 510, third monitoring circuit 520, and fourth monitoring circuit 522 are in serial communication with first balancing circuit 500, second balancing circuit 502, third balancing circuit 504, fourth balancing circuit 506, fifth balancing circuit 512, sixth balancing circuit 514, seventh balancing circuit 516, and eighth balancing circuit 518 via microprocessor 524.

Specifically, first balancing circuit 500 is electrically connected to third balancing circuit 504 in series. As a result, because the cells of first battery module 100 are electrically connected to first balancing circuit 500 in series, and because the cells of second battery module 200 are electrically connected to third balancing circuit 504 in series, the battery cells of first battery module 100 are electrically connected to the battery cells of second battery module 200 in series. These electrical connections between the balancing circuits and the battery cells within first battery module 100 and second battery module 200 allow energy to be transferred to and from the battery cells. Accordingly, the excess energy of cell 1, which is in first battery module 100, can be transferred to cell 13, which is in second battery module 200.

The bi-directional nature of the balancing circuit and the electrical connection between the individual battery cells and the balancing circuits allow the balancing circuits to discharge and charge the individual battery cells, as well as transfer charge between the individual battery cells, in the manner discussed above with respect to FIGS. 3 and 4. The serial communication between the individual battery cells and the monitoring circuits allows the monitoring circuits to monitor the voltage and temperature of the individual battery cells within first battery module 100 and second battery module 200. The serial communication between microprocessor controls the balancing circuits and the monitoring circuits.

The balancing circuits shown in FIG. 5 of the present application include transformers and resistors. In other embodiments, the balancing circuits may be configured as buck-boost converters and include inductors, switches, diodes, capacitors or other components of a buck-boost converter.

The monitoring circuits shown in FIG. 5 comprise dedicated monitoring circuits configured to monitor the temperature and voltage of each of the individual battery cells.

While the balancing circuits shown in FIG. 5 of the present application include transformers and resistors, it is understood that different embodiments of the battery management system may include a balancing circuit having different components. For example, the battery management system may include a balancing circuit having one or more current sensors. Additionally, other embodiments may include the same components of the exemplary embodiment rearranged in a different configuration.

The battery management system may include one or more balancing circuits that are configured to balance a plurality of battery cells according to an algorithm implemented by a microprocessor. In some embodiments, the balancing circuit may handle all of the monitoring functions. In other embodiments, as demonstrated by the exemplary example of FIGS. 1-5, the battery management system may include dedicated monitoring circuit(s) that may provide more precise voltage monitoring.

While the exemplary embodiment shown in FIG. 5 shows 8 balancing circuits, it is understood that other embodiments may include a different number of balancing circuits. For example, a battery management system according to an embodiment of the present application may include one balancing circuit that is in serial communication with all of the battery cells of a battery management system. In another example, a battery management system according to an embodiment of the present application may include 2 balancing circuits that are each in serial communication with half of the battery cells of a battery management system. One variation of this example may include a first balancing circuit that communicates with each of the battery cells of a first battery module and a second balancing circuit that communicates with each of the battery cells of a second battery module. In some embodiments, the battery management system may include as many balancing circuits as there are battery modules. In some embodiments, the battery management system may include as many balancing circuits as there are battery cells. The number of balancing circuits may be selected depending on a variety of factors. For example, the number of balancing circuits may be selected based on the number of battery cells that the balancing circuits are each capable of balancing and the number of battery cells within the battery management system. The number of balancing circuits may range from one balancing circuit to 48 balancing circuits.

While the exemplary embodiment shown in FIG. 5 shows 4 monitoring circuits, it is understood that other embodiments may include a different number of monitoring circuits. For example, a battery management system according to an embodiment of the present application may include one monitoring circuit that is in serial communication with all of the battery cells of a battery management system. In another example, a battery management system according to an embodiment of the present application may include 2 monitoring circuits that are each in serial communication with half of the battery cells of a battery management system. One variation of this example may include a first monitoring circuit that communicates with the battery cells of a first battery module and a second monitoring circuit that communicates with the battery cells of a second battery module. In some embodiments, the battery management system may include as many monitoring circuits as there are battery cells. The number of monitoring circuits may be selected depending on a variety of factors. For example, the number of monitoring circuits may be selected based on the number of battery cells that the monitoring circuits are each capable of monitoring and the number of battery cells within the battery management system. The number of monitoring circuits may range from one monitoring circuit to 48 monitoring circuits.

The connections between the features of the battery management system may be placed in communication with each other in a variety of different ways. For example, individual wires may be used to electrically connecting features. In another example, one or more communication buses could be used to provide communication between features of the circuits.

The shown embodiment demonstrates two battery modules powering an engine. It is understood that the disclosed battery management system may include more than two battery modules. For example, the battery management system may include battery modules within a range of three and 48 battery modules. The number of battery modules may be selected based on a variety of factors. For example, the number of battery modules may be selected based on the physical size of the battery cells, the voltage of the battery cells, the number of battery cells, and the amount of energy required to power the engine or device being powered.

While the exemplary embodiment shown in FIG. 5 includes battery modules having 24 battery cells each, it is understood that other embodiments may include a different number of battery cells within each module. For example, the battery management system may include 12 battery cells per battery module. The number of battery cells per battery module may be selected depending on a variety of factors. For example, the number of battery cells per battery module may be selected based on the size of the container holding the battery modules and/or the amount of power needed in the application of the battery management system. The number of battery cells per battery module may range from one battery cell to 48 battery cells per battery module.

The battery modules of the battery management system may include a container or casing configured to receive and store a plurality of battery cells. For example, as shown in FIG. 2, first module 100 may include first container 200, and second module 102 may include second container 202. The containers may have built-in components. For example, the containers may have electrical wiring and/or ports built into containers.

The battery cells may be stacked within the battery modules in various configurations. For example, as shown in FIG. 2, the battery cells may be stacked in two rows each containing 12 batteries. The configuration of the battery cells may be selected based on a variety of factors. For example, in some embodiments, the configuration of the battery cells may be selected based on size and/or shape of the containers of the battery modules.

It is understood that the battery management system may be configured as part of an overall power management system in an underground mine environment. If used in conjunction with this type of power management system, it is understood that any excess charge may be directed to a separate power grid in the mine. Conversely, a power grid may be employed as a source for the disclosed battery management system to facilitate balancing the charge among battery cells or modules in a pack.

While not shown in the exemplary embodiment, it is understood that the battery management system may include a charger configured to charge the individual battery cells of the system. The charger may be electrically connected to one or more of the battery cells of the first battery module and the second battery module to charge one or more of the battery cells. The charger may be incorporated into a power management system and operate from the separate power grid in a mine.

The upper and lower thresholds for charge may be programmed to desired values. For example, in some embodiments, the upper threshold may be set to a value between 70% and 100%, such as 85%. In some embodiments, the lower threshold may be set to a value between 0% and 40%, such as 35%. It is noted that battery cells used in heavy industry, such as the battery cells in the exemplary embodiment, are typically charged to about 90% and are only allowed to discharge to about 30% to protect the condition of the battery cell. In some embodiments, the battery management system may include a microprocessor that implements the upper and lower thresholds for charge.

The type of batteries used in the battery module may include any suitable type of battery, based on the application of the battery management system. For example, in heavy duty industry applications, such as underground mining vehicles, Lithium-ion battery cells may be used. The voltage of the batteries used in the battery module may include any suitable voltage. The voltage of the batteries may be selected based on a variety of factors. For example, the voltage of the batteries may be selected based on the application of the battery management system.

It is understood that the disclosed battery management system may include battery modules that are used to power something other than an engine. For example, the battery modules may be used to power accessories in a vehicle, such as power steering or air conditioning. The excess charge in battery cells can be used to run an accessory. In some embodiments, the excess charge in the battery cells may be used to power an accessory while simultaneously powering an engine or other main component.

Figure 6:
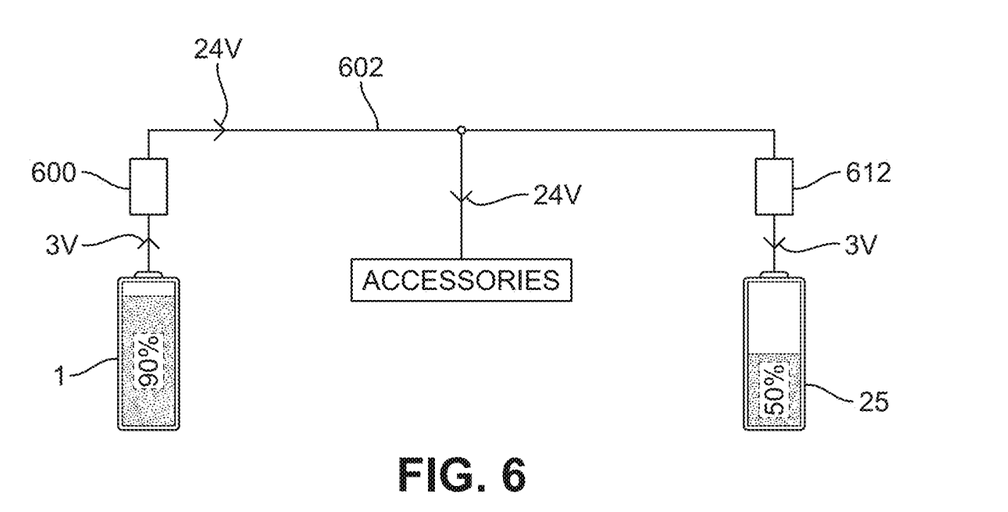
FIG. 6 shows of a representation of the charge carried by individual battery cells and a bus bar before the cells are balanced.

Referring now to FIG. 6, an isolated view of cell 1 and cell 25 is depicted. Cell 1 and cell 25 are depicted in isolation for ease of viewing and description. It should be recognized that cell 1 may be located within first battery module 100 as depicted in FIG. 3, and cell 25 may be located in second battery module 200 as depicted in FIG. 3. In this depiction, cell 1 and cell 25 have not been balance with each other. Additionally, although depicted in isolation, it should be recognized that cell 1 and cell 25 may balance with respect to the modules and not necessarily with respect to each other. That is, the charge of each cell when balanced may be about 72.5% as shown in FIG. 4.

In some embodiments, the balancing circuits may include buck-boost converters, or buck converters or boost converters. For example, first balancing circuit 500 may include a buck-boost converter. Likewise, fifth balancing circuit 512 may include a buck-boost converter. In other embodiments, separate buck-boost converters or other converters may be utilized. Buck-boost converters may be utilized to change an input or output voltage from a source. For example, cell 1 may have an output voltage of approximately 3 volts. The buck-boost converter may be utilized to increase or boost the output voltage to approximately 24 volts. The buck-boost converters may be utilized to assist in balancing the charges of the cells as previously discussed.

Cell 1 may send charge or energy through a buck-boost converter to a bus bar. As shown in FIG. 6, cell 1 is connected to first converter 600 and cell 25 is connected to second converter 612. Although shown as separate components, in some embodiments, first converter 600 may be incorporated into first balancing circuit 500 and second converter 612 may be incorporated into fifth balancing circuit 512. As shown, cell 1 sends a 3 volt charge to first converter 600. First converter 600 converts the 3 volt output from cell 1 to 24 volts. First converter 600 sends this voltage to bus bar 602. Therefore, bus bar 602 has a voltage of 24 volts.

Although described as a 3 volt output from cell 1 with an output of 24 volt output from first converter 600, it should be recognized that various input and output voltages may be obtained. For example, in some embodiments the output voltage from cell 1 may be greater or less than 3 volts. Additionally, the output voltage from first converter 600 may be greater or less than 24 volts. The buck-boost converters may be tuned or programmed to output a particular voltage depending on the particular needs of an application or component.

Once at bus bar 602, the energy may now be used for various activities or applications. In some embodiments, the energy from bus bar 602 may be sent to other cells within first battery module 100 or second battery module 200 to balance the cells with each other. In such embodiments, the voltage of bus bar 602 may be sent through a buck-boost converter to reduce the voltage to about 3 volts such that energy is transmitted to cells within second battery module 200. That is, in some embodiments, bus bar 602 may act as a pathway to other cells within first battery module 100 or second battery module 200 that have lower charge percentages. As shown in FIG. 6, the voltage is sent through second converter 612 and converted to a 3 volt charge. This voltage from second converter 612 is sent to cell 25 to balance the charge of cell 25 with that of the other cells within first battery module 100 and second battery module 200.

In other embodiments, the 24 volt energy from bus bar 602 may be transmitted to other components of mining vehicle 106 that utilize 24 volt power supplies. For example, the 24 volt energy may be utilized to power accessories onboard mining vehicle 106. In some embodiments the accessories may include, headlights, radio, hydraulics, control systems, power steering, air conditioning, or other components of mining vehicle 106. By changing the voltage from 3 volts to 24 volts, various other components within mining vehicle 106 may be powered using bus bar 602.

In some embodiments, the charge from cell 1 may be utilized to power accessories as well as balance the charge between cells of first battery module 100 and second battery module 200. That is, in some embodiments, a portion of the energy from cell 1 may be sent through first converter 600 to bus bar 602 and to an accessory. Another portion of energy from cell 1 may be sent through first converter 600, through bus bar 602, through second converter 612 and into cell 25 to charge cell 25.

Bus bar 602 may therefore act to as a pathway to reduce the charge of greater-charged cells of first battery module 100 while also powering other components of mining vehicle 106. At the same time bus bar 602 may be utilized to balance the charge amongst various cells within second battery module 200 and first battery module 100.

Figure 7:
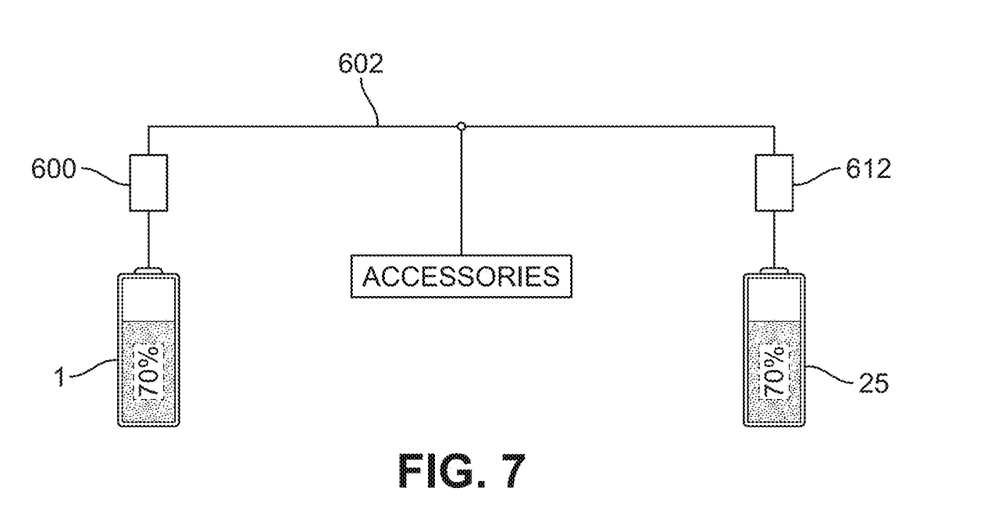
FIG. 7 shows of a representation of the charge carried by individual battery cells and a bus bar after the cells are balanced.

Referring now to FIG. 7, cell 1 and cell 25 are balanced with approximately 70% charge. In this embodiment, the charge may be lower than the 72.5% charge shown in FIG. 4 because a portion of the charge from cell 1 was used by the accessories. Therefore, the balanced charge level between cell 1 and cell 25 may be lower than in the embodiment in which no accessories were powered.

The balanced charge level between cell 1 and cell 25 may be changed depending on particular programming. For example, in some embodiments, the quantity of energy utilized by the accessories may be monitored and limited. By limiting the quantity of energy utilized by the accessories, a given or known quantity of power or energy may be conserved within first battery module 100 and second battery module 200. For example, in some embodiments, a lower level limit of charge may be set for the cells within first battery module 100 and second battery module 200. Once the cells within the battery modules reach the set charge limit energy may no longer be sent to various accessories through bus bar 602.

In other embodiments, once balanced, cell 1 as well as cell 25 may both send energy to bus bar 602. That is, both cell 1 and cell 25 may send charge through the buck-boost converters to bus bar 602. Once energy or power is sent to bus bar 602 the energy may be utilized by the accessories. In this manner the accessories may be powered by bus bar 602.

In some embodiments, utilizing accessories may decrease the time necessary to balance various cells. By providing an additional load to the cells, a greater quantity of charge may be removed from cell 1 during balancing. By removing a greater quantity of charge from cell 1, cell 1 and cell 25 may become balance quicker than in other embodiments.

As discussed previously, in some embodiments the balancing circuits may include buck-boost converters that may be utilized to increase and decrease voltage. Buck-boost converters generally include inductors, capacitors, diodes and switches. Buck-boost converters may be used in place of resistance-type voltage balancing. In resistance balancing a resistor may be used to lower the output voltage to charge a particular cell. The resistors intake voltage at a high level and output the voltage at a lower level while also releasing heat. Because the cells of a battery module do not function as well when hot, it is helpful to reduce the quantity of heat produced by a balancing system. Buck-boost converters generate less heat than resistance-type balancing systems and therefore allow a battery cell system incorporating a buck-boost converter to perform more efficiently than embodiments that include resistance-type balancing.

Additionally, the balancing circuits of the present embodiment may be able to accept greater amperage than an embodiment with resistance-type balancing. In one embodiment, a resistor may be able to accept about 2 amps of current whereas a similar balancing circuit may be able to accept about 10 amps of current. By increasing the amperage into a cell, a cell may be able to be charged or balanced quicker than when charged by lower amperage. Therefore, the time required to balance first battery module 100 with second battery module 200 utilizing balancing circuits as described above may be less than a similar balancing system utilizing resistors.

Additionally, the time required to balance various cells utilizing balancing circuits may be less than systems utilizing resistors because energy is sent from a cell with a higher capacity to a cell with a lower capacity. In resistance-type balancing, energy is sent to a resistor in order to reduce the charge of a particular cell. The energy is consumed by the resistor and turned into heat. In the embodiment as described previously, the energy is sent from cells of first battery module 100 to cells of second battery module 200. Because the cells within first battery module 100 are losing charge while the cells within second battery module 200 are gaining charge the time required to balance the cells may be reduced by at least half.

Referring now to FIGS. 6 and 7, the layout may be used to supplement expensive DC to DC converters. Some embodiments may utilize a DC to DC converter to power the various accessories of mining vehicle 106. Rather than using a DC to DC converter, cheaper buck-boosters and/or balancing circuits as described above may be utilized to provide the needed voltage to power the various accessories. For example, as shown in FIG. 7, the balanced cells may each send energy or charge to bus bar 602 to power the accessories. In some embodiments, the quantity of charge or power sent to bus bar 602 may be sufficient to power all of the accessories such that a separate DC to DC converter is not necessary. In other embodiments, the present layout of components may be utilized to supplement a DC to DC converter. By utilizing the buck-boost system as described above to supplement the needed voltage to various components the size of the DC to DC converter may be able to be decreased. A smaller DC to DC converter may reduce the overall cost of a machine incorporating the configuration of components as described above.

In some embodiments, the configuration as shown in FIGS. 6 and 7 may be utilized as a backup system in the event that a DC to DC converter fails. The backup power could be used to allow a user to move the vehicle or components to a separate location to be fixed. This backup system could decrease down time in a mining operation and increase efficiency in fixing the problem by moving the mining vehicle to a technician or work space. Further, because each cell of the modules may include a buck-boost converter, additional redundancy is built into the system. For example, a buck-boost converter could fail on an individual cell without interfering with the ability of the cells to provide an adequate voltage to bus bar 602. Therefore, the accessories powered by bus bar 602 may continue to function even if individual failures occur within the cells of first battery module 100 or second battery module 200.

In some embodiments, additional buck-boost converters may be utilized. In some embodiments, additional converters such as buck-boost, buck, or boost converters may be connected to bus bar 602. Additional converters may be able to increase the voltage to an even greater amount. For example, the 24 volts of bus bar 602 may be increased to 36 volts, 48 volts, or even higher voltages. These greater voltages may be sent to other accessories or components that require greater than 24 volts. In some embodiments, particular components may include separate converters to increase or decrease the voltage from bus bar 602 to a particular specialized amount. That is, rather than forming a new bus bar with a particular voltage, the voltage may be directly pulled from bus bar 602 and sent to an individual component requiring a certain voltage.

Figure 8:
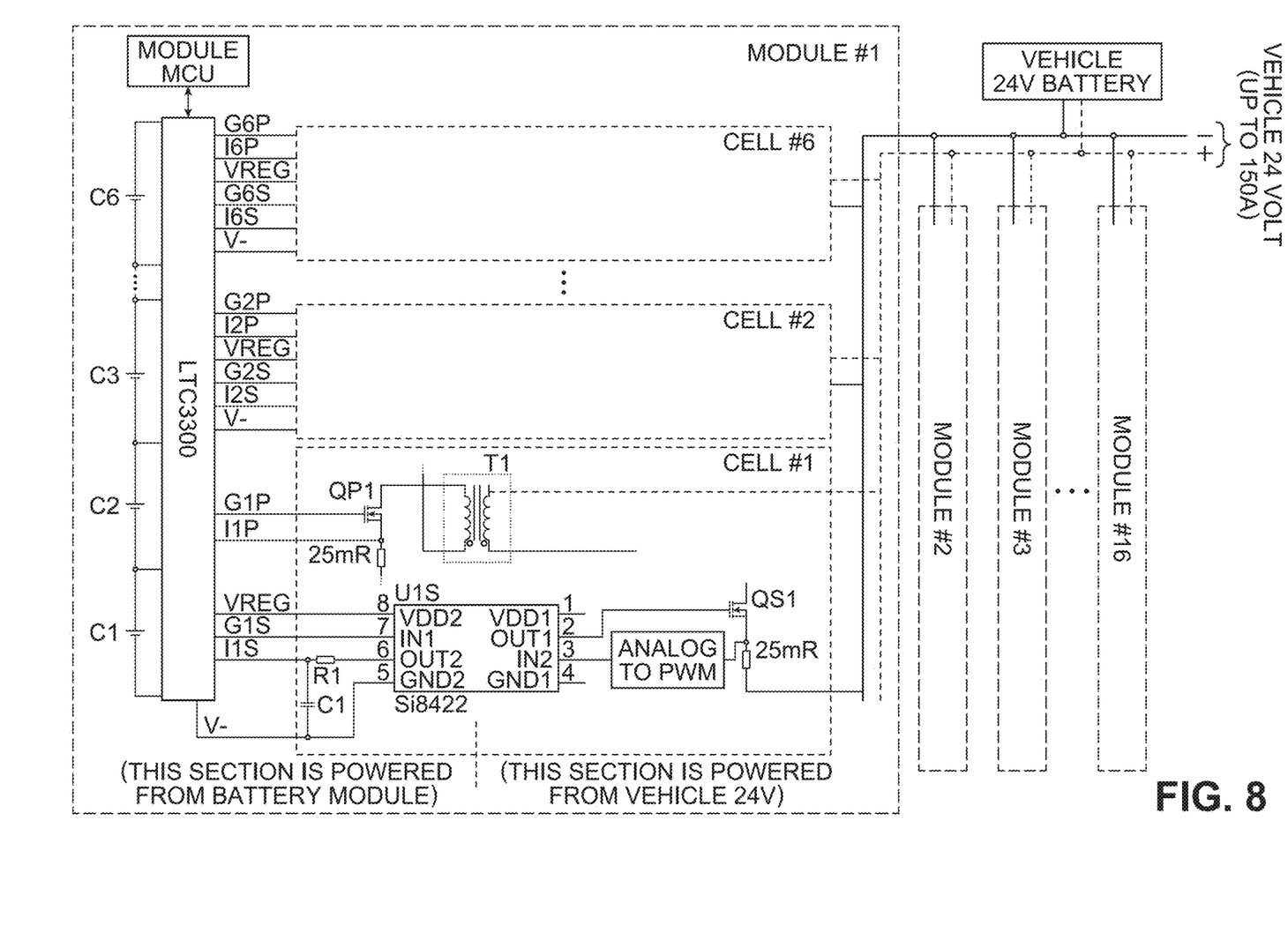
FIG. 8 shows an embodiment of a schematic representation of a battery management system.

Referring now to FIG. 8 an embodiment of a battery management system is depicted. As shown, a battery system may include multiple modules. As depicted, the battery system includes 16 modules. In other embodiments, a battery system may include greater or fewer than 16 modules. The number of modules may be varied depending on the desired voltage or amperage output. Additionally, within each module are a number of cells. As shown, module 1 includes six cells. In other embodiments, 12 cells or 24 cells may be utilized within each module. Additionally, in other embodiments, the number of cells may be greater than 24 cells, less than 6 cells, or between 6 cells and 24 cells.

Referring now to module 1, a possible layout of various cells is depicted. Each of the cells may be connected to a chip such as LTC3300. This particular chip may be utilized to balance the voltage of each of the cells as described previously. Additionally, various other chips besides LTC3300 may be utilized to assist in balancing the charge or voltages across the cells of a particular module. Further, as shown in FIG. 8, the bidirectional chips may be powered from the module. That is, module 1 may provide power to the bidirectional chips such that the chip may then balance each of the cells within module 1.

In some embodiments, another portion of the battery management system may be powered by a source other than the module. For example, in some embodiments, a portion of the battery management system may be powered by a 24 volt battery. This side of electronic circuitry may have a lower voltage than the left side of the circuitry. As shown in FIG. 8, vehicle 24V battery may be utilized to power various accessories and components within mining vehicle 106. For example, in some embodiments the 24 volt battery may be utilized to power headlights, communication components, and other components. The power produced by the modules however, may be utilized to provide power to an inverter and motor. The power produced by the modules may be used to rotate the tires of mining vehicle 106 as well as operate any hydraulic components that may be located on mining vehicle 106.

In some embodiments, the voltage across various cells within each module may vary. In some embodiments, the cells within each module are connected in series. Because voltage is additive in series the difference of voltage from cell to cell may be greater than 700 volts. In other embodiments, the voltage different may be less than 700 volts. For example, in some embodiments, the cells within each module are in series and the modules are in series with each other. The additive nature of voltage in series circuits may cause a large voltage differential between the first cell in the series and the last cell in the series.

In some embodiments, the voltage of the various cells may be isolated from other sources. As shown in FIG. 8, the voltage produce by module 1 is isolated from the voltage produced by vehicle 24V battery. Transformer T1 may be utilized to isolate higher voltage electricity from lower voltage provided by a 24 volt battery. Isolating the voltage supplies may allow for the energy produced by the modules to be used for powering various components in addition to providing power to the inverter and motor. This may allow greater flexibility when designing a system because the modules may now be able to produce lower voltage in addition to higher voltage.

Further, in some embodiments, transformer T1 may be utilized to change the voltage from the cells within module 1. As described previously, a buck, boost, or buck-boost converter may be utilized. The voltage may then be transformed from a higher voltage to a 24 volt voltage to be used or stored within the 24 volt vehicle battery.

As described previously, excess charge or voltage may be sent through a buck-boost converter and to a bus bar. In this embodiment, the bus bar may include a 24 volt battery. Therefore, excess charge may be utilized to charge or provide power to vehicle 24V battery. The 24 volt battery may then be utilized to power various components and described previously. Further, as described previously, during balancing of the cells rather than only directing energy to lower-charge cells, energy may also be sent to the 24 volt battery to supply energy to various accessories. This additional use of the excess charge from a particular cell may decrease the time necessary to balance the cells within each module. That is because each cell may be able to output a greater quantity of energy to various sources such as the 24 volt battery. Further, because there is another source for 24 volt supply to various components the size of the 24 volt battery to be reduced.

In one aspect, the disclosure provides a battery management system, comprising a first battery module, a second battery module, and a first converter. The first battery module has a first plurality of battery cells, including a first battery cell and a second battery cell. The second battery module has a second plurality of battery cells, including a third battery cell and a fourth battery cell. The first converter is electrically connected to both the first battery cell and the third battery cell. The first converter is configured to increase or decrease the voltage between the first battery cell and a bus bar.

In another aspect, the disclosure provides a battery management system, comprising a first battery module, a second battery module, and a first converter. The first converter is electrically connected to at least one battery cell of the first plurality of battery cells and a second converter is connected to at least one battery cell of the second plurality of battery cells. The first converter and the second converter are both connected to a bus bar. The bus bar is configured to transfer charge between the at least one battery cell of the first plurality of battery cells and the at least one battery cell of the second plurality of battery cells.

In another aspect, the disclosure provides a battery management system, comprising a first battery module, a second battery module, and a buck-boost converter. The buck-boost converter is electrically connected to at least one battery cell of the first plurality of battery cells and at least one battery cell of the second plurality of battery cells. The buck-boost converted is configured to balance the level of charge amongst both the first plurality of battery cells and the second plurality of battery cells. Additionally a bus bar is connected to the buck-boost converter and the bus bar is also connected to at least one accessory.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

The invention claimed is:

1. A battery management system for an electric vehicle, comprising:
    at least one electric motor onboard the electric vehicle;
    a first battery module comprising a first plurality of battery cells;
    a second battery module comprising a second plurality of battery cells;
    wherein the first battery module and/or the second battery module provide power to the electric motor to rotate at least one set of tires of the electric vehicle;
    a first buck-boost converter electrically connected to the at least one battery cell of the first plurality of battery cells;
    a second buck-boost converter electrically connected to the at least one battery cell of the second plurality of battery cells;
    a plurality of electrically-powered accessories onboard the electric vehicle;
    a bus bar connected to the first buck-boost converter, the second buck-boost converter, and the plurality of electrically-powered accessories; and
    wherein the plurality of electrically-powered accessories onboard the electric vehicle are powered from the bus bar.

2. The battery management system according to claim 1, wherein the first buck-boost converter is configured to increase or decrease a voltage between the at least one battery cell of the first plurality of battery cells and the bus bar; and
    wherein the second buck-boost converter is configured to increase or decrease a voltage between the at least one battery cell of the second plurality of battery cells and the bus bar.

3. The battery management system according to claim 1, wherein the first buck-boost converter is incorporated into a first bi-directional balancing circuit; and
    wherein the second buck-boost converter is incorporated into a second bi-directional balancing circuit.

4. The battery management system according to claim 1, wherein one of the first buck-boost converter or the second buck-boost converter is configured to increase a voltage to 24 volts to provide electrical power to the plurality of electrically-powered accessories.

5. The battery management system according to claim 1, wherein one of the first buck-boost converter or the second buck-boost converter is configured to use excess charge from one of the at least one battery cell of the first plurality of battery cells or one of the at least one battery cell of the second plurality of battery cells to provide power to at least one accessory of the plurality of electrically-powered accessories.

6. The battery management system according to claim 1, wherein the at least one battery cell of the first plurality of battery cells has an excess charge that is greater than a charge of the at least one battery cell of the second plurality of battery cells; and
wherein the first buck-boost converter is configured to use the excess charge to provide power to at least one accessory of the plurality of electrically-powered accessories.

7. The battery management system according to claim 6, wherein the first buck-boost converter is further configured to use the excess charge to balance charge amongst the first plurality of battery cells and the second plurality of battery cells.

8. The battery management system according to claim 1, further comprising a monitoring circuit electrically connected to each battery cell of the first plurality of battery cells and electrically connected to each battery cell of the second plurality of battery cells, wherein the monitoring circuit is configured to monitor the status of charge of the battery cells of the first plurality of battery cells and the battery cells of the second plurality of battery cells.

9. A battery management system for an electric vehicle, comprising:
at least one electric motor onboard the electric vehicle;
a plurality of battery modules, each battery module comprising a plurality of battery cells;
wherein the plurality of battery modules provide power to the electric motor to rotate at least one set of tires of the electric vehicle;
at least one buck-boost converter electrically connected to at least one battery cell of the plurality of battery cells of each battery module;
at least one electrically-powered accessory onboard the electric vehicle;
a bus bar connected to each of the buck-boost converters and the at least one electrically-powered accessory; and
wherein the buck-boost converters are configured to increase electrical charge from the at least one battery cell of the plurality of battery cells to a higher voltage on the bus bar to power the at least one electrically-powered accessory.

10. The battery management system according to claim 9, further comprising a direct current (DC) to direct current (DC) converter; and
wherein the at least one electrically-powered accessory is also configured to receive electrical power from the DC to DC converter.

11. The battery management system according to claim 10, wherein the buck-boost converters are electrically connected onboard the electric vehicle so as to provide a backup electrical system for providing electrical power to the at least one electrically-powered accessory in the event that the DC to DC converter fails.

12. The battery management system according to claim 9, wherein the at least one electrically-powered accessory is powered by the electrical charge provided from the plurality of battery cells of each battery module by the buck-boost converters without receiving electrical power from a direct current (DC) to direct current (DC) converter.

13. The battery management system according to claim 9, further comprising at least one additional buck-boost converter to further increase the voltage on the bus bar to power the at least one electrically-powered accessory.

14. The battery management system according to claim 9, wherein the at least one electrically-powered accessory utilizes 24 volt electrical power;
wherein the electric motor utilizes high-voltage electrical power greater than 24 volts from the plurality of battery modules; and
wherein the buck-boost converters are configured to increase the electrical charge from the at least one battery cell of the plurality of battery cells to 24 volts on the bus bar to power the at least one electrically-powered accessory.

15. A battery management system for an electric vehicle, comprising:
at least one electric motor onboard the electric vehicle;
at least one battery module comprising a plurality of battery cells, the at least one battery module configured to provide electrical power to the electric motor of the electric vehicle, wherein the electric motor utilizes high-voltage electrical power greater than 24 volts from the at least one battery module;
at least one accessory onboard the electric vehicle;
a 24 volt battery onboard the electric vehicle, wherein the 24 volt battery is configured to provide electrical power to the at least one accessory of the electric vehicle;
wherein a voltage produced by the at least one battery module is isolated from a voltage produced by the 24 volt battery;
the battery management system further comprising at least one buck-boost converter connected to at least one battery cell of the plurality of battery cells of the at least one battery module; and
wherein the at least one buck-boost converter is configured to decrease a higher voltage from the plurality of battery cells of the at least one battery module to a 24 volt voltage for the 24 volt battery.

16. The battery management system according to claim 15, further comprising a transformer electrically connected to the at least one battery module and the 24 volt battery, wherein the transformer isolates a higher voltage from the at least one battery module from a lower voltage from the 24 volt battery.

17. The battery management system according to claim 15, wherein the 24 volt voltage is used to charge the 24 volt battery.

18. The battery management system according to claim 15, wherein the at least one accessory includes one or more of headlights, communication components, power steering, air conditioning, hydraulics, or control systems.

19. The battery management system according to claim 15, wherein the electrical power from the at least one battery module is provided to both (1) the electric motor of the electric vehicle, and (2) the 24 volt battery to power the at least one accessory.

* * * * *